Patented Jan. 22, 1924.

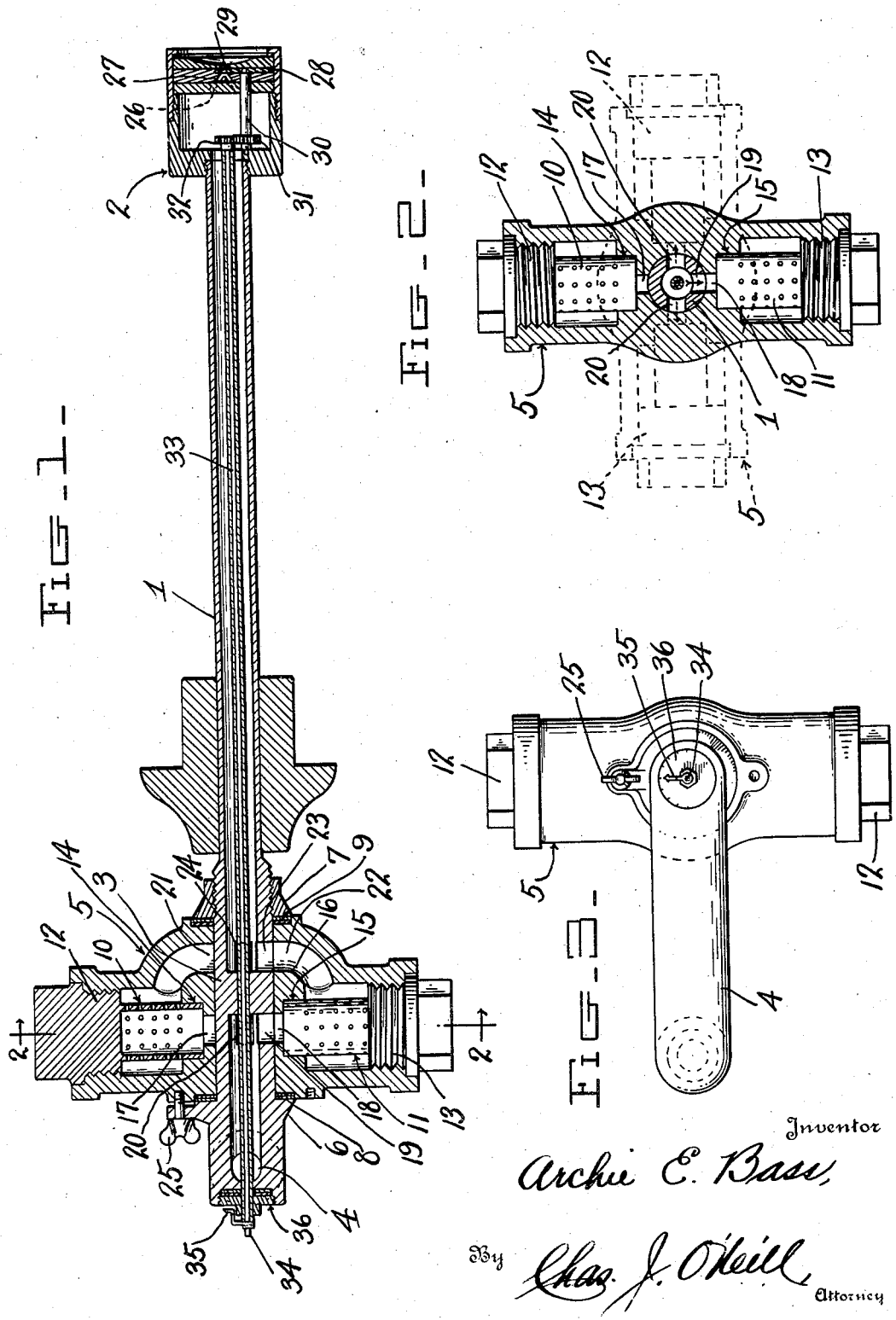

1,481,407

UNITED STATES PATENT OFFICE.

ARCHIE E. BASS, OF BIRMINGHAM, ALABAMA.

FILTERING DEVICE.

Application filed February 3, 1922. Serial No. 533,967.

*To all whom it may concern:*

Be it known that I, ARCHIE E. BASS, residing at Birmingham, Alabama, have invented certain new and useful Improvements in Filtering Devices; and I do hereby declare the following to be a full, clear, and exact description of the invention, such as will enable others skilled in the art to which it appertains to make and use the same.

This invention relates to certain improvements in oil burners, and particularly to a device of this character involving the use of a filter or strainer for the oil directed under pressure through the burner, but is not limited to this specific use.

The principal object of the invention is to provide a filtering means for use in this connection, involving the cooperation of two strainers so associated with that portion of the burner disposed outside of the furnace with which it is used, as to permit the withdrawal of one of the strainers for cleaning purposes without interfering with the operation of the burner or disarranging any of the working parts thereof.

Another object of the invention resides in the particular arrangement whereby the necessary communication is established from the source of supply through both of the strainers to the burner nozzle, during the substituting of one strainer for the other, so that the cold oil previously trapped in the strainer not in use will not suddenly be directed to the burner nozzle when this strainer is finally brought into operation, which will be hereinafter more fully described.

The invention also contemplates a means for adjusting the orifice or discharge opening of the burner nozzle from a point without the furnace, so that the burner will not have to be entirely removed, which is the common practice, to accomplish this result.

Briefly stated, the invention comprises a burner in the form of a pipe or tube adapted to be projected into the furnace, having its inner end provided with a jet nozzle, or the like, and its outer end connected to the source of supply for the oil which is directed to the burner under the desired pressure. This outside portion of the burner tube is somewhat enlarged, and has rotatably mounted thereon a hollow casing provided with diametrically oppositely positioned strainers, the outer end portions of each strainer being in the form of a screw plug and providing a means for securing and maintaining these strainers within the rotary casing. Adjacent the inner end of each strainer is a port adapted to register with certain radially disposed ports formed in the burner tube, said ports in the burner tube being positioned so that when the casing is vertically disposed, communication is established from the source of supply into the outer end of the burner tube, and thence through the port in the burner tube downwardly into one of the strainers registering with said port, through said strainer and back into the tube through other registering ports carried by the rotary casing and burner tube, the oil finally being discharged through the nozzle of the burner. When in this position of the rotary casing or casting, the lower strainer is the only one being used, the inlet and outlet ports of the casing associated with the upper strainer being cut off so that said upper strainer can be readily removed for cleaning without disturbing in any way the functioning of the burner. When it is desired to clean the lower strainer, the strainer casing is rotated to bring the upper strainer into play, whereby the strainer previously used can be cleaned in the manner as hereinbefore described. It will be noted that when the lower strainer is moved to the upper position, there is a certain amount of oil trapped in that portion of the strainer casing, which eventually cools, so that after this strainer has been cleaned, and subsequently brought into operation, this cold oil would be directed to the burner nozzle, which oftentimes would result in the putting out of the flame at the discharge end of the nozzle. To prevent this, the burner tube is provided with oppositely disposed, horizontally arranged ports, which will register with both strainers when the strainer casing is in its horizontal position, and, when in this position, the oil will be directed from the source of supply to the nozzle through both of the strainers, whereby the heated oil under pressure will be mixed with the cold oil previously referred to, and the resulting mixture will be of sufficiently high temperature to prevent any material change in the flame at the burner nozzle. It is therefore customary, when reversing the strainers, to momentarily leave the casing in its horizontal position, for the reasons previously stated, before completing the reversing operation.

It has also been found necessary at times to reduce the size of the orifice or discharge opening of the nozzle, and heretofore this has been accomplished by entirely removing the burner from the furnace, which necessitates of course the shutting off of the supply of oil to that burner. In furthering the object of the present invention, applicant has provided a burner nozzle with a rotary disc, or the like, provided with graduated apertures or perforations adapted to successively register with the main discharge opening of the nozzle, a rotation of this disc bringing one of the desired apertures into operation. To rotate the disc, the same is connected by suitable gearing to a rod extending through the burner tube to the outside of the furnace, whereby the desired adjustment of the nozzle can be effected without removing the burner from the furnace.

The preferred embodiment of the invention is illustrated in the accompanying drawing, in which:

Fig. 1 is a vertical sectional view of the assembled burner;

Fig. 2 is a view partly in section and partly in elevation on line 2—2 of Fig. 1, the horizontal position of the strainer casing being shown in dotted lines; and Fig. 3 is an end elevation thereof.

Referring to the drawings in detail, 1 represents the burner tube proper, having secured to its inner end a nozzle 2, and being provided with an enlarged outer end portion 3, said outer end portion communicating with a source of supply 4 for furnishing the desired heated oil under pressure to the burner.

Rotatably mounted on this enlarged outer end 3 of the burner tube 1 is a casing, 5, said casing being positioned between annular shoulder members 6 and 7 carried by the outer end 3 of the burner tube. Interposed between the casing and the annular shoulders 6 and 7 are suitable packing washers, 8 and 9, preferably of lead and steel. Radially positioned within the casing 5 are two diametrically opposite strainers or filters 10 and 11 having their outer ends terminating in enlarged screw plugs, 12 and 13 respectively, whereby the strainers are removably secured within the casing 5. The inner ends of the strainers 10 and 11 are held in recesses or seats 14 and 15 respectively, formed in an enlarged centrally disposed annular portion 16 carried by the casing 5 and immediately surrounding the burner tube. This enlarged central portion 16 of the casing is provided with ports 17 and 18 communicating with the interiors of the strainers 10 and 11 respectively. Adapted to register with these ports 17 and 18, at the proper time, are radially disposed ports 19 and 20 formed in the burner tube. The port 19 is located on the lower side of the burner tube, and the ports 20 are formed in the diametrically opposite sides of said tube, as clearly shown in Figs. 1 and 2.

In addition to the ports 17 and 18, communicating with the inner ends of the strainers, the casing 5 is also provided with outlet ports 21 and 22 in communication with the sides of the respective strainers 10 and 11. These ports 21 and 22 are adapted to communicate with ports 23 and 24 formed in the burner tube, in a manner similar to the communicating of the ports 17 and 18 with ports 19 and 20.

In Fig. 1, the various parts are shown with the lower strainer in operation, and the upper strainer cut off. In this position it will be noted that the heated oil under pressure from the source of supply is conducted to the outer end of the burner tube from the pipe 4 through the registered ports 18 and 19, through the strainer 11, and back into the burner tube 1 by way of the registering ports 22 and 23, and thence to the burner nozzle 2. In this position of the strainers 10 and 11, the ports 17 and 21 communicating therewith are entirely cut off from the oil supply, and said upper strainer can be readily removed and cleaned. During this operation, the oil, which is necessarily trapped in the upper compartment surrounding the strainer 10, becomes cool, so that if the strainers were immediately reversed, this cold oil would precede the charge of warm oil under pressure to the burner, resulting in obvious disadvantages hereinbefore referred to. To prevent this, the burner tube is provided with diametrically opposite, horizontally disposed ports 20 and 24, so that as the casing 5 is rotated to reverse the strainers, the same is momentarily arrested in its horizontal position, which permits the oil under pressure to be directed through both strainers, and thereby causes a mixing of the warm oil and cold oil, obviating the difficulty which would otherwise be experienced for the reasons stated.

In order to maintain the casing 5 in its vertical or normally operative position, a locking device 25, comprising a wing bolt or the like, is provided, as clearly shown in the drawing.

The burner nozzle 2 is constructed with the usual discharge orifices 26, terminating in a single opening 27 through which the oil is sprayed to obtain the desired atomizing effect thereof. It often occurs, however, that this opening requires regulating, and heretofore it has been necessary to entirely remove the burner from the furnace to perform this adjustment. In the present construction, there is provided a rotary disc 28 constructed with a series of graduated openings 29, said openings adapted to register with the discharge orifice 27 of the nozzle. This regulating disc 28 is connected with a stub shaft 30 carrying a gear wheel 31, said gear 31 being in mesh with a corresponding gear 32, keyed to the inner end of an adjusting rod 33, said rod being disposed within the burner tube and extending out from the rear end thereof. The extreme outer end of this adjusting rod 33 is provided with a squared end, or the like, 34, to fit a specially designed wrench for turning this rod. This outwardly projecting end portion of the rod 33 is also provided with an indicator hand, or the like, 35, cooperating with an appropriate dial 36, the indications thereon corresponding to the openings in the regulating disc 28, so that the desired regulation of the orifice 27 can be determined by a reading of the dial.

From the foregoing description, it will be noted that the straining device for the oil direct to the burner will be capable of being cleaned, and the burner nozzle can also be regulated, without disturbing the operation of the burner or removing the same from the furnace.

It is, of course, to be understood that the particular strainer construction hereinbefore described, is not necessarily limited to oil burners, but is equally well adapted for use in connection with any fluid directed through an analogous device. It is to be also understood that said strainer arrangement can be placed in any part of the supply pipe line and does not have to be associated directly with the burner tube. Furthermore, applicant is not to be limited to the specific means of securing the strainers in the casing as shown and described, as there may be times, owing to the size of the device, when this particular securing means would be impractical. The present construction is only one of many modifications of this part of the device and the same is to be limited only so far as defined by the claims.

What I claim is:

1. In a straining device for fluids, the combination with a conduit therefor, of a casing rotatably mounted on said conduit, independent straining or filtering means positioned within said casing, inlet and outlet ports to and from said filtering means carried by said casing, corresponding ports formed in that part of the conduit surrounded by said casing, said ports being located so that the necessary communication from said conduit through both filtering means, and back into the conduit, will be established only when said casing is in its horizontal position, and communication established through one of said filters only when the casing is in its vertical position.

2. In a straining device, the combination of a conduit therefor, of a casing rotatably mounted on said conduit, radially disposed independent removable strainers positioned within said casing, inlet and outlet ports to and from said filtering means carried by said casing, corresponding ports formed in that part of the conduit surrounded by said casing, said ports being located so that the necessary communication from said conduit through one of said filters only, and back into the conduit, will be established when the casing is in its vertical position.

3. In a straining device for fluids, the combination of a conduit therefor, of a casing rotatably mounted on said conduit, radially disposed independent strainers positioned within said casing, means for securing said strainers in the casing, whereby they may be removed from the ends thereof, inlet and outlet ports to and from said filtering means carried by said casing, corresponding ports formed in that part of the conduit surrounded by said casing, said ports being located so that the necessary communication from said conduit through one of said filters only, and back into the conduit, will be established when the casing is in its vertical position.

4. In a straining device for fluids, the combination with a conduit therefor, of a substantially cylindrical casing rotatably mounted at its intermediate portion on said conduit, radially disposed independent cylindrical strainers positioned within said casing each side of said conduit, means for removably securing said strainers within said casing, whereby the same may be removed from the ends thereof, inlet and outlet ports to and from said filtering means carried by said casing, corresponding ports formed in that part of the conduit surrounded by said casing, said ports being located so that the necessary communication from said conduit through one of said filters only, and back into the conduit, will be established when the casing is in its vertical position.

5. In a straining device for liquid fuel burners and the like, the combination with a burner tube and nozzle therefor, of a casing rotatably mounted on the fuel receiving end of said burner tube, independent strainers positioned within said casing, inlet and outlet ports to and from said filtering means carried by said casing, corresponding ports formed in that part of the conduit surrounded by said casing, said ports being located so that the necessary communication from said conduit through one of said filters only, and back into the conduit, will be established when the casing is in its vertical position.

6. In a straining device for liquid fuel burners and the like, the combination with a burner tube and nozzle therefor, of a substantially cylindrical casing rotatably mounted at its intermediate portion on the fuel receiving end of said burner tube, independent cylindrical strainers positioned within said casing each side of said burner tube, means for removably securing said strainers within said casing whereby they may be removed from the ends thereof, inlet and outlet ports to and from said filtering means carried by said casing, corresponding ports formed in that part of the conduit surrounded by said casing, said ports being located so that the necessary communication from said conduit through one of said filters only, and back into the conduit, will be established when the casing is in its vertical position.

7. In a straining device for liquid fuel burners and the like, the combination with a burner tube and nozzle therefor, of a substantially cylindrical casing rotatably mounted at its intermediate portion on the fuel receiving end of said burner tube, independent cylindrical strainers positioned within said casing each side of said burner tube, screw-threaded enlargements formed on the outer ends of each strainer, whereby said strainers are removably threaded into the outer ends of said casing, inlet and outlet ports to and from said filtering means carried by said casing, corresponding ports formed in that part of the conduit surrounded by said casing, said ports being located so that the necessary communication from said conduit through both filtering means, and back into the conduit, will be established only when said casing is in its horizontal position, and said communication established through one of said filters only when the casing is in its vertical position.

8. In a straining device for liquid fuel burners and the like, the combination with a burner tube and nozzle therefor, of a substantially cylindrical casing rotatably mounted at its intermediate portion on the fuel receiving end of said burner tube, independent cylindrical strainers positioned within said casing each side of said burner tube, screw-threaded enlargements formed on the outer ends of each strainer, whereby said strainers are removably threaded into the outer ends of said casing, inlet and outlet ports to and from said filtering means carried by said casing, corresponding ports formed in that part of the conduit surrounded by said casing, said ports being located so that the necessary communication from said conduit through both filtering means, and back into the conduit, will be established only when said casing is in its horizontal position, and said communication established through one of said filters only when the casing is in its vertical position, means for maintaining a tight joint between the rotary casing and burner tube, and means for securing said casing in its operative positions.

In testimony whereof I affix my signature.

ARCHIE E. BASS.